F. STRICKLAND.

OIL EXTRACTING APPARATUS.

APPLICATION FILED JAN. 26, 1918.

Reissued May 31, 1921.

15,116.

2 SHEETS—SHEET 1.

Inventor

Fred Strickland by

Foster Freeman Watson & Coit

Attorney

F. STRICKLAND.
OIL EXTRACTING APPARATUS.
APPLICATION FILED JAN. 26, 1918.
Reissued May 31, 1921.
15,116.
2 SHEETS—SHEET 2.
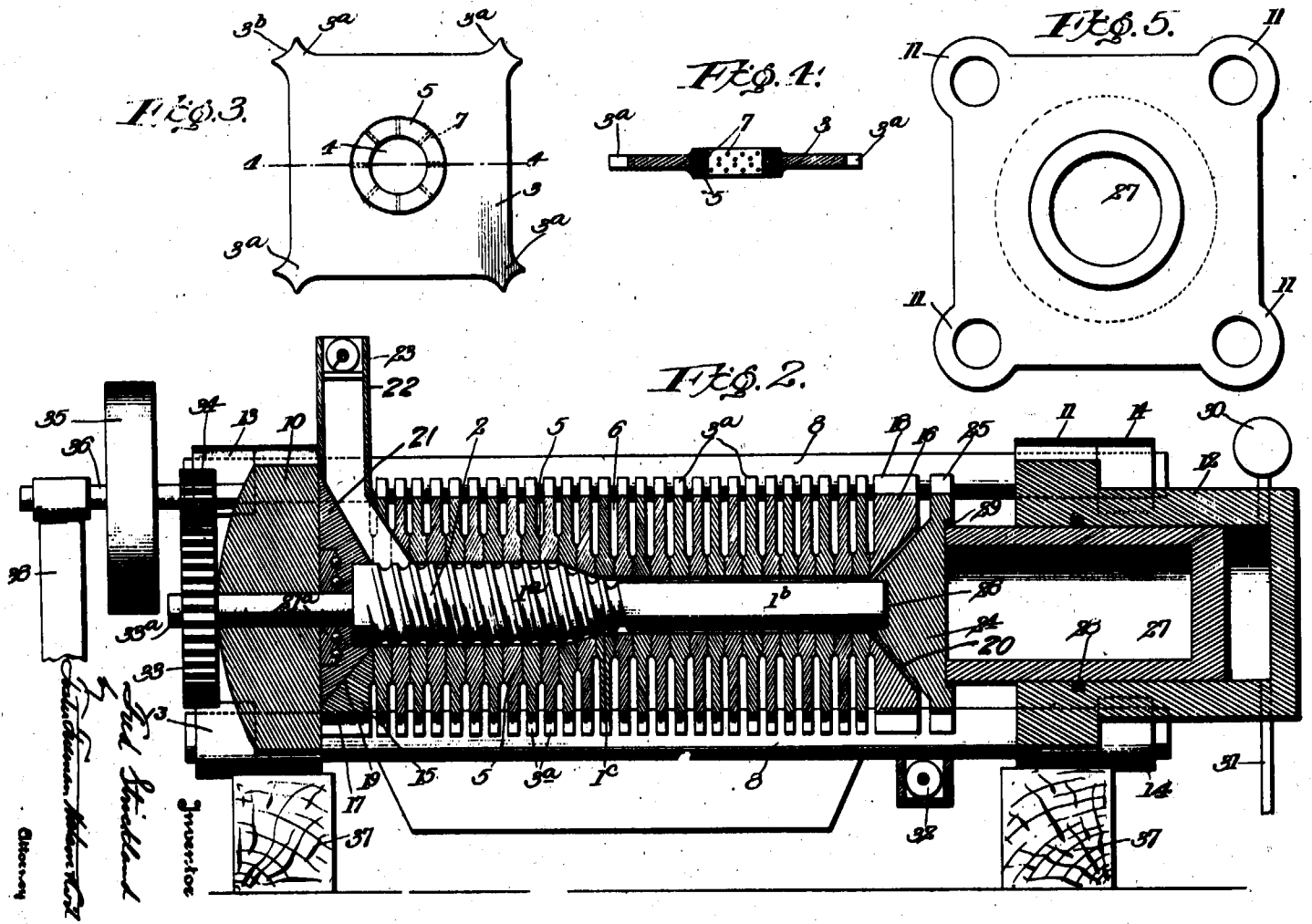

UNITED STATES PATENT OFFICE.

FRED STRICKLAND, OF ANDERSON, SOUTH CAROLINA.

OIL-EXTRACTING APPARATUS.

15,116. Specification of Reissued Letters Patent. Reissued May 31, 1921.

Original No. 1,233,930, dated July 17, 1917, Serial No. 120,861, filed September 18, 1916. Application for reissue filed January 26, 1918. Serial No. 214,028.

*To all whom it may concern:*

Be it known that I, FRED STRICKLAND, a citizen of the United States, and resident of Anderson, county of Anderson, State of South Carolina, have invented certain new and useful Improvements in Oil-Extracting Apparatus, of which the following is a specification.

The apparatus constructed in accordance with my invention is adapted for the continuous compression of substances such as cottonseed, linseed, peanuts, and beans, for extracting oil therefrom in an effective and economical manner.

The details of construction, arrangement, and operation of the parts are as hereinafter described with reference to the accompanying drawings, in which:

Fig. 2 is a longitudinal sectional elevation through the same;

Fig. 3 is an elevation of one of the plates, a plurality of which are assembled in a series to form the body or shell of the apparatus;

Fig. 4 is a sectional view of a plate taken substantially on the line 4—4 of Fig. 3; and Fig. 5 is an inner end view of the tail member formed with the cylinder having a piston therein.

Figure 1:
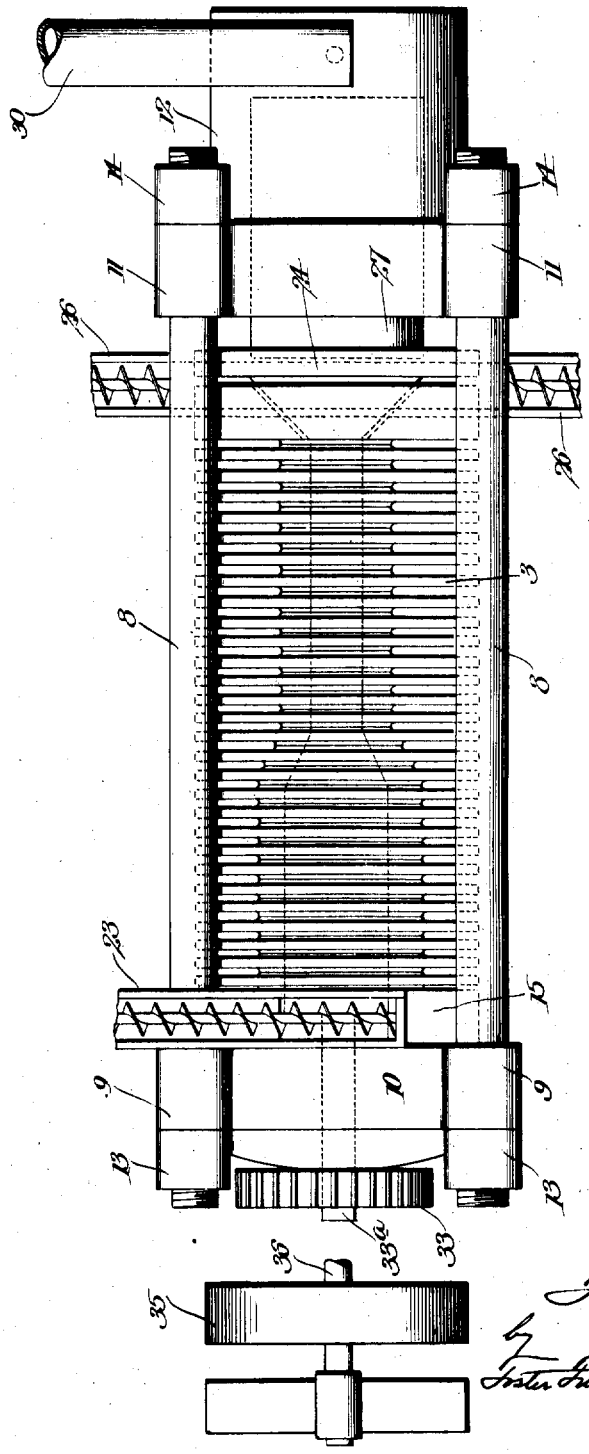
Figure 1 is a plan view of the apparatus.

Referring to Fig. 2 I provide a rotary compressor and conveyer which is circular in cross section and comprises a portion $1^a$ connected to a reduced or smaller portion $1^b$ by a tapered or conical portion $1^c$, the large portion $1^a$ and conical portion $1^c$ being formed with a spiral groove 2 which serves to feed forward and compress the oil bearing material as the compressor is rotated.

A plurality of plates 3 of substantially rectangular outline are assembled in a series to form the body or shell of the apparatus. Each of these plates at its corners is formed with an ear $3^a$ the outer edge of which is curved as at $3^b$ to bear against the tie rods 8. The plates are formed with a central bore 4 and centrally arranged bosses on opposite sides thereof which constitute a hub 5. Each hub is formed with perforations or ducts 7 for the discharge of the expressed oil. As clearly shown in Fig. 2, these plates are assembled in a series with the ears $3^a$ thereof engaging the tie rods 8 and with the central bores 4 in alinement whereby a longitudinal passage is formed through the apparatus. The compressor is mounted within this passage or chamber, the bores of the plates surrounding the spirally grooved portion being of such diameter as to fit closely thereagainst, while the bores of the plates surrounding the reduced or smooth portion of the compressor are of larger diameter than the said portion, thus forming an annular space around the same for the passage of the material. It will be observed that the hubs of the plates being thicker than the outer portions thereof, serve to space the said outer portions thereby forming annular radial spaces 6 therebetween.

The plates are held in position by the four stout tie rods 8, each of which at one of its ends is mounted in a boss or ear 9 formed upon a head member 10, and at its other end in similar boss or ear 11 formed upon a tail member 12. The ends of the tie rods are threaded at the head end of the apparatus for the nuts 13 and at the tail end for the nuts 14 whereby separation of the head and tail members is prevented. Interposed between the tail member and the series of plates is a plate 16 having the ears 18 engaging the tie rods, and interposed between the head member and the series of plates is a thick plate 15 having the ears 17 at its corners engaging the said tie rods.

The plate 15 is formed with a conical bore 19 which receives a conical plate 21 between which and the head member is an antifriction thrust bearing $21^a$. The plate 16 is formed with a conical bore 20 which constitutes the outlet or discharge opening for the residue and is adapted to be controlled by a valve member 24 having the ears 25 engaging the tie rods. This valve member is formed with a conical portion which registers with the conical bore of the plate 16 and the apex thereof is formed with a seat 26 for the end of the reduced portion $1^b$ of the compressor.

The tail member is formed with a rearwardly projecting cylinder which has a piston 27 slidably mounted therein and extending through its open forward end. The valve member 24 has its side adjacent the piston formed with a circular recess 29 in which the end of the piston is mounted. If desired, the cylinder may be provided with a packing ring 28 to prevent leakage by the piston. The cylinder has connection with a fluid pressure supply pipe 30 and the outlet pipe 31, the discharge through which may be controlled in any suitable manner.

The material is fed to the apparatus by means such as a screw conveyer 23 which discharges into a chute 22, as shown. The by-products or residue are discharged through the outlet 20 and may fall into a conveyer 32 which is arranged to carry away the same.

The compressor is formed with a reduced end or spindle 33[a] which extends through and has a bearing in the head member 10. This spindle has secured thereto a gear 33 driven by a pinion 34 on a shaft 36 which in turn is rotated by means of a belt driven pulley 35.

The main part of the apparatus is supported upon a suitable frame-work 37 and a bearing for the shaft 36 is supported by a member 38.

In the operation of the device the oil bearing material is brought to the chute 22 by means of the conveyer 23. The rotation of the compressor feeds the material through the passage formed by the bores of the plates at the same time compressing the same and expressing the oil which is discharged through the perforations or ducts 7. The amount of compression and the rate of operation of the machine is controlled by the resistance which is offered to the opening of the valve member 24. This resistance is produced by the fluid pressure within the cylinder which acts against the piston 27 thereby forcing the valve member toward its seat. It will be seen that by controlling the pressure within the said cylinder the action of the valve may be governed very easily and efficiently.

The plates 3 with their perforated heads provide an exceedingly strong body or shell construction. The pressure produced by the compressor of course tends to burst the shell or body and it will be seen that the webs of the plates thus constitute reinforcing members which are very strong in a circumferential direction.

The thrust of the compressor is transmitted to the head member 10 and the thrust against the discharge valve is carried by the tail member 11, and the separation of these two members is resisted by the tie rods 8. Hence, as the longitudinal thrust of the apparatus is taken by the tie rods and the bursting or the hoop stresses produced by the compressor are taken by the plates, an exceedingly rugged apparatus is provided and one which utilizes fully the strength of these parts. In machines where the shell or body takes both longitudinal and circumferential stresses or tensions, it is obvious that the material of the shell is subjected to very severe stresses. In practice the stresses in this latter type of apparatus are so great that it is very difficult to provide a shell strong enough to resist rupture.

The fluid pressure means carried by the tail member constitutes a very efficient construction for regulating the discharge valve. As distinguished from spring controlled valves the pressure exerted against the valve member 24 is uniform no matter how far the valve is moved from its seat. Consequently, the compressive action of the apparatus is uniform and does not vary with the amount of opening of the discharge valve. It will be noted that the discharge valve is guided for longitudinal movement at four points, that is, on the four tie rods. Furthermore, the end of the large piston is seated in a recess in the valve and bears directly against the same. These two features in conjunction practically eliminate any tendency of the discharge valve to bind in its sliding movement. Obviously, this is of considerable importance as, if the valve binds, the compressive action of the apparatus will not be uniform. Moreover, the force acting to close the discharge valve may be controlled very easily and quickly, as by merely turning a valve.

The apparatus above described is particularly adapted for manufacture in accordance with the modern principles of standardization. It will be seen that the capacity of a press constructed in accordance with my invention may be varied merely by changing the compressor and the length of the tie rods. Thus the plates, the head and tail members, and several other parts may be used for several different sizes of machines. It is not thought necessary to detail the advantages of this feature as the advantages of standardization are well known.

Although a specific embodiment of the invention has been described, it is apparent that many of the details thereof may be varied without departing from the spirit of the invention.

Having thus described the invention what is claimed as new and desired to be secured by Letters Patent is:—

1. A press for the purpose specified comprising a spirally grooved compressor which is circular in cross section, and a body surrounding said compressor which is formed of a series of plates having thickened hub portions and reduced or thinner outer portions, the hubs having ducts leading outward from the compressor into the space between the outer portions of the plates, as described.

2. In a press of the character described, the combination of a compressor formed of two lengthwise cylindrical portions differing in diameter, and an intermediate tapering portion by which they are connected, the larger and tapered portions having a spiral feed groove, a body surrounding said compressor and formed of a series of plates arranged parallel, central or hub portions being provided with ducts leading outward and their outer portions being thinner than the hub portions and thus separated by narrow spaces, the smooth surfaces of the reduced portion of the compressor being separated from the surrounding body by a narrow annular space, and means for rotating the conveyer, as described.

3. The combination with a spirally grooved compressor, and a surrounding body formed of a series of plates, lateral passages for escape of liquid, the end plate 16 having a conical bore, a conical closure 24 adapted to fit in said bore, and a hydraulically operated piston whose inner end is seated in said conical closure, as described.

4. An oil extracting apparatus including in combination, a shell, a rotary compressor and conveyer member disposed in said shell having a circular end portion, a slidable valve member controlling the discharge of residue from one end of the shell having a bearing for said circular end portion of the compressor member, and yielding means opposing opening movement of said valve member.

5. An oil extracting apparatus including in combination a shell having lateral outlets for oil means for continuously compressing and forcing oil bearing material through said shell from one end to the other, a head member at the inlet end of said shell and a tail member at the outlet end, said tail member having a cylinder in line with said shell, a plurality of parallel tie rods connecting said head member and tail member, a longitudinally movable valve member for the discharge end of said shell and arranged between the said shell and tail member and having portions slidably engaging said tie rods to permit longitudinal movement but prevent turning, a piston in said cylinder having a projecting portion bearing against said valve to close it, and means connecting said cylinder to a source of liquid under pressure.

6. The combination with a spiral compressor of a surrounding body having lateral passageways for the escape of liquid, a plurality of longitudinal tie rods outside of said body and projecting beyond it at the discharge end, a closure fitting the discharge end and having lateral supporting portions slidably engaging said rods, a hydraulic cylinder with an open end in line with said discharge end secured to the ends of said rods, a piston in said cylinder and means for directly transmitting pressure from said piston to said closure at points equally distributed around its center to move it to closed position.

7. In a press of the character described, the combination of a compressor formed of two lengthwise cylindrical portions differing in diameter, and an intermediate tapering portion by which they are connected, the larger and tapered portions having a spiral feed groove, a body surrounding said compressor, and fitting it throughout its larger diameter and tapering portion but having a narrow annular space around the smooth portion of smaller diameter and extending beyond the end of said smaller portion, means for laterally discharging the expressed oil from said body, means connected to said compressor at the end of greatest diameter for supporting and driving it, a closure for the discharge end of said body and the small end of said compressor, and means for applying constant pressure to said closure tending to close the discharge.

8. In a device of the class described, the combination with a compressor having thereon a spiral conveyer, a body provided with means for lateral escape of expressed oil surrounding said compressor laterally and having an inlet at one end and a conical discharge end surrounding the end of said compressor, means at the inlet end of said body for supporting and driving said compressor, a longitudinally movable closure having a conical portion fitting the discharge end of said body and provided with a cylindrical seat or bearing for the end of said compressor, means for slidably supporting said closure at a plurality of points removed from its center, and means for applying a constant pressure on said closure to close said discharge end.

In testimony whereof I affix my signature.

FRED STRICKLAND.